United States Patent Office 2,860,993
Patented Nov. 18, 1958

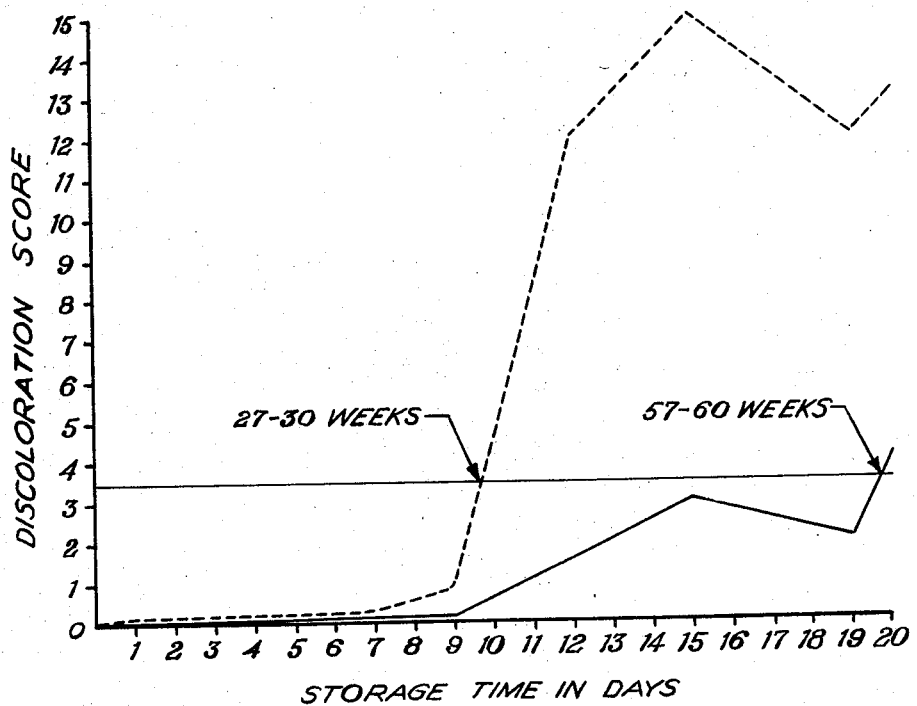

2,860,993

PROCESS OF STABILIZING THE COLOR OF COOKED MEAT

Robert H. Maher, Chicago, Ill., assignor to Swift & Company, Chicago, Ill., a corporation of Illinois Application June 15, 1953, Serial No. 361,742

10 Claims. (Cl. 99—187)

The present invention relates generally to the treatment of animal material for the purpose of stabilizing the color thereof and, more specifically, to the stabilization of the color of animal material such as meat or the like in which the oxygen-bearing pigments have been denatured.

Heretofore meats have been treated in their raw state for the purpose of retaining the bright red color normally associated with fresh meats by the consumer. The oxygen-bearing pigments in meats include myoglobin and hemoglobin, both of which contribute to the bright red coloring present in freshly butchered meats. In normal handling of meats the pigments become oxidized to substances such as metmyoglobin and methemoglobin. These substances give the meat a brown color which is undesirable from a commercial standpoint.

The bright red coloring in raw meats has been partially maintained by treatment of the raw meats with various color stabilizers capable of reacting with the oxidized pigments to form a fairly stable red pigment. This type of reduction is capable of changing the brown-color oxidized pigments such as metmyoglobin and methemoglobin to fairly stable red pigments. This reaction, however, is reversible and eventually the reduced pigments will again become oxidized, causing the brown color to reappear.

This problem of the preservation of the coloring of meats is not, however, confined merely to the color stabilization of raw meats but also extends into the field of cooked meats prepared for canning. In meat canning, the product is thoroughly cooked which in turn results in a drastic modification of the meat protein. The meats are rich in natural protein which upon cooking for purposes of canning become coagulated and denatured. With respect to the normally appearing pigments such as myoglobin and hemoglobin, a drastic modification is also noted. These pigments, which normally are oxidized to metmyoglobin and methemoglobin, are denatured and as a result the metmyoglobin and methemoglobin are not present. If any of the latter pigments should be present prior to cooking they are likewise denatured and remain in their denatured forms. The hemoglobin and myoglobin normally present are denatured to hemochromogen and myochromogen. During the cooking of meats, temperatures are employed which are sufficiently high to effect complete denaturation of proteins and pigments such as myoglobin and hemoglobin. During the cooking step, a state of equilibrium normally exists between native and denatured proteins at 110° F. to 120° F. The equilibrium temperature range is low compared with the normal cooking temperature range (200°–210° F.), and as the temperature approaches the normal cooking range, the equilibrium shifts rapidly to the denatured side. At such temperatures the reaction is completed rapidly so that substantially all the protein is denatured during the cooking process. Coagulation of the protein results from denaturation. It has been well established that egg material, a protein food, undergoes substantial coagulation when heated to temperatures as low as 147° F. From the foregoing it can be readily seen that many changes in the components of meat are produced by the cooking of the meat.

The denaturation of the meat protein does not eliminate discoloration problems. Even without the unpleasant color-producing pigments metmyoglobin and methemoglobin present, a color change is noted following the cooking and canning process. This color change is not at all similar to the reversible reaction present in raw meats, which can be controlled by oxidizing and reducing the pigments present, because such pigments have been denatured by cooking. This color change is the formation of a surface discoloration of a greenish nature which is even more undesirable from a commercial standpoint than that resulting from the presence of metmyoglobin and methemoglobin in fresh meat. This discoloration gives the meat an appearance of being unfit for human consumption. Thus, the cooked meat appears spoiled even though it is commercially sterile.

It is, therefore, an object of this invention to stabilize the color of animal material such as meat and the like in which the oxygen-bearing pigments have been denatured.

It is a further object of this invention to alleviate objectionable discoloration occurring in cooked meats in the absence of metmyoglobin and methemoglobin.

Additional objects, if not specifically set forth herein, will become readily apparent from the following detailed description of the invention.

The accompanying drawing sets forth a comparative graph which will hereinafter be described.

Generally the present invention comprises treating meats during or after cooking with a color stabilizing agent of comparatively low concentration for the purpose of retarding discoloration of the meat during storage thereof.

More specifically, the invention comprises the treatment of cooked meat including hearts and livers, with ascorbic acid, its salts and analogues, or with any material, which contains ascorbic acid as a component.

It has been found that ascorbic acid, its salts and analogues or materials containing ascorbic acid, are capable of stabilizing the coloring of meats, including hearts and livers, which have been cooked and which contain coagulated and denatured proteins. This particular method of treatment is highly desirable in the preparation of meats for canning. Cooked meats do not contain metmyoglobin or methemoglobin, but they do contain denatured pigments which may be converted so as to impart a green discoloration of the cooked meats. The brown color present in cooked meats cannot be converted by action of reducing agents to the red color present in fresh meats. This is due to the fact that the denaturation reaction is not a reversible one and the resulting brown color is due to the presence of denatured material. But this brown color is not stable itself and further reactions, such as oxidation, occur which eventually result in the presence of a green color imparting a highly undesirable appearance to the product. By the use of ascorbic acid, salts of ascorbic acid, reductone, levulinic acid, or other analogues the subsequent discoloration is retarded and the cooked meats maintain their normal coloring for longer periods of time. The procedure followed in the treatment of meats according to this invention includes the application of ascorbic acid, its salts, reductone, levulinic acid or any analogue of ascorbic acid to the meats, hearts and livers either during or subsequent to the thorough cooking of the meats, hearts and livers. Comparatively low concentrations of ascorbic acid may be utilized, resulting in a range of concentrations up to and including 0.3 percent.

In the accompanying drawing a graph is shown wherein the discoloration score for untreated cooked meat taken over a period of several days storage time is compared with the discoloration score for cooked meat treated with 0.1 percent ascorbic acid added, the latter score being taken over the same period of time. In compiling the information utilized in this graph, the meat was cooked and canned in the conventional manner and stored under accelerated storage conditions during which time discoloration score readings were taken for untreated and treated meat. With respect to the discoloration score utilized, it was agreed that all scores above 3.5 are unsatisfactory from a commercial standpoint. As can be noted in the graph, the discoloration limit is set forth by the horizontal solid line intersecting the discoloration score readings at 3.5. The solid curve appearing on the graph represents the readings for treated meat, while the dotted curve represents readings for untreated meat. Under accelerated storage conditions one day is equal to approximately three weeks of commercial storage under ordinary conditions. As can be seen from the graph, the limit of the storage time for the untreated meat is approximately 10 days under accelerated conditions, whereas for treated meat the storage time extends to approximately 20 days under accelerated conditions. The above accelerated storage time limits are equivalent to approximately 27 to 30 weeks of regular storage for untreated meat and 57 to 60 weeks of regular storage for treated meat. As can be seen from the results shown in this graph, discoloration is not entirely prevented but its development is very substantially retarded.

The accelerated storage conditions were obtained by placing the samples of canned meat in a basket and the basket was placed in an airtight chamber. The chamber was evacuated, after which oxygen under pressure was introduced. The oxygen was added to a pressure of approximately 20–25 p. s. i. and held at this level between intermittent inspections of the samples. The chamber temperature was maintained at normal room temperature.

The discoloration score was arbitrarily set up on the basis of visual inspection. Numbers 1–3 indicate a range of very slight discoloration, whereas the range of 4–6 indicates a slight gray-green discoloration. In the entire range the score 3.5 is considered the highest satisfactory score for an acceptable commercial product. Numbers 7–9 indicate moderate dark green-gray discoloration, while numbers 10–15 indicate severe and very dark green to green-black discoloration.

The following examples are intended to be illustrative only of the manner in which the invention is carried out and are not to be construed as limiting thereto.

*Example I*

Beef heart was cooked in its natural juice for 1¼ hours at boiling temperatures. Following the cooking step, the beef heart was comminuted to the desired texture, broth plus salt added, following which ascorbic acid was added thereto. The mixture was then deaerated, canned and processed until commercially sterile at 212° to 240° F. The ascorbic acid was added in a proportion of 100 mgs. to 100 gms. of beef heart. As a result of this treatment color stability during storage was substantially increased.

*Example II*

Pork was cooked and comminuted in the same manner as described in Example I. Sodium ascorbate was added to the pork at a ratio of 100 mgs. to 100 gms. of product. This mixture was then deaerated, canned and processed as set forth in Example I. Here again discoloration of the product during storage was substantially retarded.

*Example III*

Beef heart was prepared as set forth in Example I. The procedure of the treatment utilized in this instance was the same as appears in Example I, with the exception that 100 mgs. levulinic acid was added for every 100 gms. of product. Discoloration normally occurring during storage was retarded.

*Example IV*

A beef heart sample was prepared as in Example I except that reductone was added in an amount of 54 mgs. of reductone to 100 gms. product. A retarding of discoloration during storage resulted. Fifty-four (54) mgs. of reductone is equivalent to 0.054% reductone per 100 gms. of the product.

*Example V*

Beef heart was treated according to the procedure set forth in Example I. The color stabilizing agent utilized was extract of the seaweed Irish moss, which was added in an amount of 495 mgs. per 100 gms. of product. This extract is known in the art under the trade name "Kraystay." Discoloration of the stored product was retarded. Four hundred ninety-five (495) mgs. is equal to 0.495% of color stabilizing agent per 100 gms. of product.

*Example VI*

Beef heart again was treated as described in Example I with the exception that an extract of Irish moss and the salt sodium ascorbate were combined for purposes of stabilizing the color. The extract of Irish moss was added in an amount of 495 mgs. to 100 gms. of product while sodium ascorbate was added in an amount of 295 mgs. to 100 gms. of product. As a result the development of discoloration during storage was retarded.

In all of the above examples, it was noted that discoloration was retarded by the addition of stabilizing agents and that the desirable appearance of the canned meat was maintained during storage for a much greater period than can normally be practiced when untreated cooked meats are stored.

The present invention may be utilized in the treatment of all meats canned under conventional practices and has particular utility in the treatment of meats prepared for baby food. Such latter canned meats contain the comminuted meat itself plus a broth of the meat and salt. Color stabilization, according to the teachings of this invention, can be applied to all cooked meats including beef, pork, hearts, lamb, liver, liver and bacon, veal and chicken.

Obviously many modifications and variations of the invention as hereinbefore set forth may be made without departing from the spirit and scope thereof, and therefore only such limitations should be imposed as are indicated in the appended claims.

I claim:

1. In the process of preparing a canned food product containing meat, the steps which comprise: cooking said meat sufficiently to insure the denaturization of the protein and pigments therein; adding to said cooked meat from about 0.054% to about 0.495% of a substance selected from the group consisting of ascorbic acid, reductone, levulinic acid, salts and analogues of ascorbic acid, and compounds containing ascorbic acid as a component thereof; and, thereafter, canning the product which includes said color-stabilized meat.

2. The process of claim 1 wherein the substance is ascorbic acid.

3. The process of claim 1 wherein the substance is reductone.

4. The process of claim 1 wherein the substance is levulinic acid.

5. The process of claim 1 wherein the substance is an analogue of ascorbic acid.

6. The process of stabilizing the color of cooked meat which comprises: adding to said cooked meat at least about 0.054% of a substance selected from the group consisting of ascorbic acid, reductone, levulinic acid, salts and analogues of ascorbic acid, and compounds containing ascorbic acid as a component thereof, said percentage of said substance being based on the weight of said cooked meat.

7. The process of claim 6 wherein the substance is ascorbic acid.

8. The process of claim 6 wherein the substance is reductone.

9. The process of claim 6 wherein the substance is levulinic acid.

10. The process of claim 6 wherein the substance is an analogue of ascorbic acid.

References Cited in the file of this patent

UNITED STATES PATENTS

| | | |
|---|---|---|
| 2,541,572 | Coleman et al. | Feb. 13, 1951 |
| 2,553,533 | Komarik et al. | May 15, 1951 |
| 2,567,085 | Stoloff | Sept. 4, 1951 |
| 2,707,154 | Lehmann et al. | Apr. 26, 1955 |
| 2,739,899 | Hollenbeck | Mar. 27, 1956 |